(12) United States Patent
Shaklai

(10) Patent No.: US 6,270,829 B1
(45) Date of Patent: Aug. 7, 2001

(54) CARBON MONOXIDE SATURATED, PRESERVED RAW MEAT

(75) Inventor: Nurith Shaklai, Tel Aviv (IL)

(73) Assignee: Ramot University Authority for Applied Research and Industrial Development, Ltd. (IL)

( * ) Notice: Subject to any disclaimer, the term of this patent is extended or adjusted under 35 U.S.C. 154(b) by 0 days.

(21) Appl. No.: 09/480,812

(22) Filed: Jan. 10, 2000

Related U.S. Application Data

(62) Division of application No. 08/945,264, filed as application No. PCT/US96/05373 on Apr. 18, 1996, now Pat. No. 6,042,859.

(51) Int. Cl.⁷ ....................................................... A23B 4/16
(52) U.S. Cl. .......................... 426/641; 426/263; 426/645; 426/647; 426/129; 426/315
(58) Field of Search ..................................... 426/129, 316, 426/312, 263, 264–266, 418, 410, 413, 641, 645, 647, 332, 315

(56) References Cited

U.S. PATENT DOCUMENTS

| | | | |
|---|---|---|---|
| 3,459,117 | * | 8/1969 | Koch et al. . |
| 3,930,040 | * | 12/1975 | Woodruff . |
| 4,001,446 | * | 1/1977 | Hood . |
| 4,089,983 | * | 5/1978 | Hood . |
| 4,224,347 | * | 9/1980 | Woodruff . |
| 4,522,835 | * | 6/1985 | Woodruff et al. . |
| 4,744,199 | * | 5/1988 | Gannon . |
| 4,917,906 | * | 4/1990 | Lotz . |

FOREIGN PATENT DOCUMENTS

| | | | | |
|---|---|---|---|---|
| 214619 | * | 10/1992 | (AU) . | |
| 18559192 | * | 1/1993 | (AU) . | |
| 5316939 | * | 12/1993 | (JP) | ...................................... 426/129 |
| WO96/33096 | * | 10/1996 | (WO) . | |

OTHER PUBLICATIONS

J. of Food Science, vol. 37 (1972), pp. 820–823, Copy in 426/418, 1972.*
Can. Inst. Food Sci. Technol. J., vol. 9, No. 3, Copy in 426/129, 1976.*
Meat Science, vol. 5(3), May 1981, p. 215–222, Copy in 426/129, May 1981.*
J. of Food Quality, Jun. 1994, v. 17(3), pp. 231–244, Copy in 426/129, Jun. 1994.*

* cited by examiner

*Primary Examiner*—Steven Weinstein
(74) *Attorney, Agent, or Firm*—Kohn & Associates

(57) ABSTRACT

A method for preserving meat and the meat processed thereby is disclosed. The method includes the steps of exposing raw meat to an atmosphere consisting essentially of carbon monoxide and maintaining the meat in a sealed container to maintain color and freshness while retarding bacterial growth.

1 Claim, 12 Drawing Sheets

CARBON MONOXIDE SATURATED, PRESERVED RAW MEAT

CROSS REFERENCE TO RELATED APPLICATIONS

This is a divisional application of U.S. patent application Ser. No. 08/945,264, filed Jan. 20, 1998, now U.S. Pat. No. 6,042,859 and which is incorporated herein by reference which in turn is a national stage of PCT/US96/05373 filed Apr. 18, 1996.

BACKGROUND OF THE INVENTION

1. Technical Field

The present invention relates to a method for preserving raw meat and more specifically relates to a method for preserving raw meat by exposing the meat to an atmosphere consisting essentially of carbon monoxide.

2. Background Art

It is well known in the meat processing industry that from the time animals are slaughtered, measures must be taken to preserve the meat and prevent it from becoming rancid or spoiled. The measures to preserve raw meat must be implemented and carried through from the time the animal is first slaughtered through the time the meat is purchased and ultimately consumed by the purchaser.

Historically, preservation of the freshness or quality of the meats has been practiced for hundreds, if not thousands of years. Early preservation techniques of meat took the form of drying or "jerking" meat and packing or storing cuts of meat in salt. This method, while somewhat effective for preserving meat and keeping it from becoming spoiled, had many drawbacks not the least of which was the incorporation of large amounts of salt into meat slated for human consumption.

The use of additives or preservatives such as nitrates and nitrites to meats is another common technique for preserving meat over time. However, there is ever increasing evidence that such additives may have harmful, even carcinogenic drawbacks. These drawbacks detract from the use of these compounds as mechanisms for the long term preservation of meat.

With the introduction of reliable means for refrigeration, i.e., the ability to maintain a low temperature regardless of the external environment, the long-term preservation of raw meat has been greatly enhanced and greatly increased the duration of the preservation. Frequently, in modern meat processing, animals are slaughtered at one place which can be remote from the point of sale and the eventual consumer, and as much as a week can pass before the meat is actually consumed. This lag between the slaughtering of the meat and its consumption requires that the meat be constantly maintained under refrigeration in order to preserve its quality and prevent its degradation over this time period.

For example, an animal (a cow) may be slaughtered and cut into halves or quarters which are then forwarded to a wholesaler or retailer where they may be divided into smaller cuts such as steaks or roasts. During the transfer of the meat from the slaughter house to the wholesaler or retailer, the meat must be maintained, frequently the meat is frozen in order to preserve its quality. After the meat has been divided into cuts for sale to the eventual consumer, it must also be maintained under constant refrigeration in order to preserve its quality. Under this distribution scheme, it can be from a few days to more than a week before the meat is purchased and consumed. It, therefore, becomes evident that this constant requirement for very low temperatures greatly contributes to the cost of meat.

Another example of the costly disadvantages of very low transportation and storage temperatures can be illustrated by practice of long distance overseas shipment and distribution of frozen meat. Today, freezing is a standard method of distributing meat processed in one region of the world to another region where it is to be consumed. Overseas shipment of frozen meat is both very costly and thawed meat obtained by this method is no longer considered to be "fresh" meat. That is, once a piece of meat has been frozen, by definition it is no longer considered to be "fresh." A method of overseas transportation of meat which maintains the "freshness" of meat transported for distribution would be highly desirable. Since the only method available for long distance overseas distribution of meat is by shipping frozen meat, no method currently exists which would allow for the overseas distribution of "fresh," unfrozen meat.

Transportation of slaughtered meat from the slaughter house to the wholesaler or retailer requires the use of some form of refrigerated transportation, such as refrigerated tractor-trailer trucks. This is a costly mode of transportation since it requires specialized equipment and extra fuel to provide and maintain refrigeration.

In addition to preserving the overall quality and fitness of the meat for consumption, other methods have been derived which are aimed at preserving the color of fresh meat. That is, methods have been developed which maintained for example, the red color of fresh meat, such as beef.

Typical examples of methods for treating raw meat to preserve the color of the meat are disclosed in U.S. Pat. No. 3,459,117 to Koch et al., U.S. Pat. No. 4,001,446 and U.S. Pat. No. 4,089,983 both to Hood, and U.S. Pat. No. 4,522, 835 and U.S. Pat. No. 3,930,040 to Woodruff et al. All of these patents disclose methods or processes for preserving or maintaining the color of meat such as beef, poultry or fish.

Both of the Hood references disclose methods of exposing an animal protein source to a reducing agent and then an environment of carbon monoxide in order to preserve the bright red color of protein source. Additionally, the Hood et al. references only treat slurries of the protein source as this is required for saturation by the carbon monoxide. The source is then mixed with the remainder of the food stuff to prepare a moist dog food. Further, the references are concerned only with the application of carbon monoxide in order to preserve the color of product and both require subsequent processing, such as canning or heat sterilization, in order to preserve the actual quality and freshness of the product. Additionally, the Hood '983 reference discloses the addition of a sufficient amount of microbiological and bacteriological inhibitors to further preserve the product.

The Woodruff et al. '835 reference discloses a process for maintaining a good color and the freshness meat by first exposing meat to an atmosphere with a small amount of oxygen and then exposing the meat to a modified atmosphere containing a small amount of carbon monoxide to effect the conversion of myoglobin to carboxymyoglobin. A third required step is the maintenance of the meat in an atmosphere of higher than 10% carbon dioxide.

The Woodruff et al. '040 patent discloses a process for storing or shipping fresh meat in a modified gaseous atmosphere. The process requires maintaining refrigerated meat in an artificial atmosphere composed of oxygen, carbon dioxide and carbon monoxide as well as nitrogen. The carbon monoxide may be removed from the modified material after the meat has been treated for at least one hour.

The Woodruff et al. patents teach maintaining the color in meat by treating the meat with a mixture of gases including carbon monoxide. That is, the Woodruff et al. patents teach chemical alteration of the surface of the meat to maintain the color of the meat and utilize refrigeration for meat preservation. Additionally, the Woodruff et al. patents teach the treatment of meat using a gaseous mixture of carbon monoxide, oxygen, carbon dioxide, and nitrogen. This method of treatment results in the creation of a storage environment which has low oxygen concentration and a carbon dioxide concentration of approximately ten percent. This type of gaseous mixture creates optimal growth conditions for the growth of microaerophil bacteria such as *Helicobacter pylori* and *Campylobacter jejuni* which are known to be pathogens which cause widespread gastroenteritis. The Woodruff et al. method of treating meat does maintain the color of fresh meat, however, the Woodruff et al. method has the disadvantage of accelerating bacterial contamination of meat treated by the Woodruff et al. method, thus shortening the storage life of the meat treated thereby.

The Koch et al. '117 patent discloses a cover useful for treating fresh red meat with carbon monoxide in order to maintain the bright red color of the meat. Koch et al., teaches a cover comprised of two films which are sealed together around the edges and which confines a quantity of carbon monoxide gas therebetween. Both film layers are substantially carbon monoxide impermeable when dry, however; when the film is brought into contact with a freshly cut sample of red meat, the moisture in the meat wets the film and transforms the film into a carbon monoxide permeable structure. The carbon monoxide then contacts the meat sample thereby causing the meat to maintain its desired red color.

The Australian Patent Document No. AU-A-18559/92 to Tamayama et al., discloses a method for maintaining and improving the quality of meat by causing meat to contact and absorb carbon monoxide gas in a sealed container and then requiring removal of the carbon monoxide gas from the container. Exemplifying the criticality of the removal of the carbon monoxide gas from the container, the patent requires that the carbon monoxide gas within the container be sucked and discharge by means of a pump.

Heretofore, the treatment of raw meat with carbon monoxide has been taught simply as a mechanism for preserving the color of the meat and, not as a mechanism for the long-term preservation of a meat sample over time in a fresh, non-frozen form.

While the above-disclosed patents teach the exposure of raw meat to gas mixtures containing carbon monoxide or the exposure of meat slurries to carbon monoxide in combination with other steps, they fail to teach a simple method of exposing raw meat solely to carbon monoxide.

In order to overcome the problems and deficiencies of the prior art methods, it is desirable that a method of preserving raw meat be introduced which eliminates the cost and associated problems with the prior art preservation techniques.

Applicant has developed a single step method for preserving meat by exposing raw meat to an atmosphere consisting essentially of carbon monoxide and, then, storing the meat in a sealed container. Unlike prior art preservation methods, no additional steps, compounds or additives are required in order to prevent the growth of microbiological or bacterial organisms.

SUMMARY OF THE INVENTION AND ADVANTAGES

According to the present invention, a method for preserving meat by exposing raw meat to an atmosphere consisting essentially of carbon monoxide is shown. Meat treated according to the present invention may not require any form of subsequent refrigeration under certain conditions and time constraints and can be stored for long periods of time following treatment with the carbon monoxide without significant bacterial growth, without freezing, and without a loss in meat quality.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
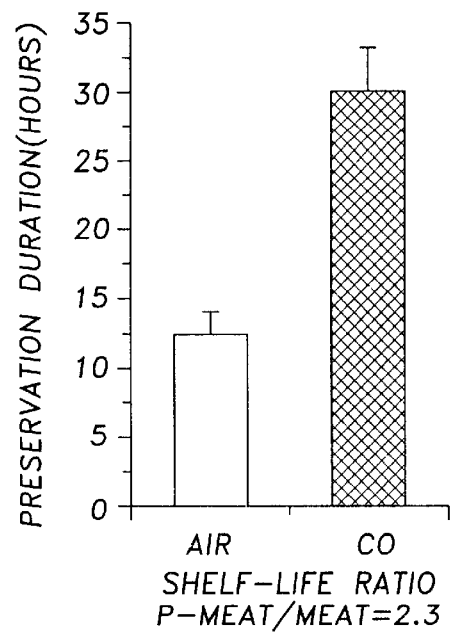
FIG. 1 is a bar graph of the relationship between aerobic bacterial growth on a fresh meat sample stored at 22–30° C. over time in either a CO treated environment or an air only environment.

Generally, the present invention provides a method for preserving meat by exposing raw meat, processed or not, to an atmosphere consisting essentially of carbon monoxide (CO) and, subsequently, storing the meat in a sealed container.

For the purposes of the present invention, the term "meat" is defined to include all types of fresh meat and fresh poultry such as beef, pork, veal, lamb, chicken, turkey, fish and the like. The meat may be in the form of carcasses, primals (e.g., quarters), subprimals (e.g., top round), or retail cuts (e.g., steaks, ground meat and roasts). The process is also effective on whole animals including, but not limited to, cattle, chickens, and fish. Unlike prior art methods, the meat need not be slurried or otherwise pretreated. "Fresh meat" is defined as a meat article which has not been frozen and subsequently thawed before its sale or consumption.

By preserving, it is meant that the meat maintains a pleasing color, does not spoil and develop a foul smell, bacterial growth is significantly inhibited or retarded, and remains completely pleasing, edible and consumable by humans and other animals. Preservation is not only maintained on the surface of the meat, but also throughout the entirety of the meat. That is, the meat is preserved throughout the thickness of the meat. "Pleasing color" implies that the color of the meat, preserved by the method according to the present invention, is such that it stimulates the appetite to consume the meat. That is, the color and odor of the preserved meat is such that a consumer would be enticed by the meat and would want to consume the meat. Again, meat color is also preserved throughout the thickness of the meat.

The term "without freezing" is defined as storing the meat wherein the temperature is kept between approximately −2 to 30° C. The term "without freezing" also excludes the use of any device or method for freezing the meat. Such devices include, mechanical or electrical refrigeration devices such as refrigerators, freezers, coolers, and chillers. This term also excludes the preservation of meat by freezing through storage on ice.

Exposing raw meat to an atmosphere consisting essentially of carbon monoxide is defined as bringing into intimate contact both carbon monoxide gas and the meat being treated. The atmosphere preferably consists of carbon monoxide. This term also includes the complete conversion of myoglobin present in the meat sample to carboxymyoglobin and, the complete conversion of myoglobin to carboxymyoglobin/carboxyhemoglobin in fish. The meat is completely immersed or saturated with carbon monoxide.

More specifically, a cross-section of meat is completely immersed in or saturated to its core with carbon monoxide from the exposed surfaces through the entire cross-section (thickness) including its core region and retains the carbon monoxide until the meat is cooked. Thus, as stated above, the meat is preserved throughout its thickness.

Carbon monoxide is inherently a very inert gas. Carbon monoxide is relatively more inert than nitric oxide gas (NO) released from nitrites which have been used as preservatives for meat for several hundred years. Carbon monoxide is a normal metabolite in the body. It is produced indigenously as a product of heme catabolism (mostly the breakdown of hemoglobin). Carbon monoxide is further converted to carbon dioxide and is released from the body in that form. Recently, it has been found that normal metabolism utilizes carbon monoxide as a neurological messenger. (Baranaga, 1993) The high toxicity of carbon monoxide generally stems from its ability to compete with oxygen for binding to hemoglobin.

Practically all of the carbon monoxide (over 99.9%) taken up by meat will be maintained as hemoglobin and myoglobin (Hb/Mb) bound forms. The distribution of carbon monoxide in the meat is assumed to be about half in each globin type. This estimation is based on the fact that mammalian muscles contain approximately two-thirds of their globins as hemoglobin and one-third as myoglobin, but when muscle becomes packed as meat, it looses a portion of its hemoglobin.

Both hemoglobin and myoglobin bind carbon monoxide much more strongly than oxygen. Native Hb/Mb contain iron and divalent oxidation state ($Fe^{+2}$) and only in this form are Hb/Mb capable of binding the gas ligands $O_2$, NO, and CO. Following any change in the iron oxidation state, Hb/Mb loose their CO binding ability. Denaturation of the proteins (e.g. by heat) can also result in loss of CO binding potential (as well as other ligands).

Hb/Mb are established catalyzers of the oxidation process in biological tissues. Under regular atmospheric conditions, the Hb/Mb in fresh meat, which are in their native form, exist in a $O_2$ bound form, the so-called oxy-Hb/Mb. Oxy-Hb/Mb tends to undergo autooxidation to met-Hb/Mb namely the oxidation of the Hb/Mb divalent iron to $Fe^{+3}$ can concomitantly with the formation of superoxide anion $O_2^-$ by the reaction

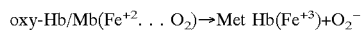

$$\text{oxy-Hb/Mb}(Fe^{+2}\ldots O_2) \rightarrow \text{Met Hb}(Fe^{+3}) + O_2^-$$

The superoxide anion is unstable and further forms hydrogen peroxide. ($H_2O_2$) which together with Hb/Mb acts as a highly active peroxidation system. Met-Hb/Mb no longer binds ,any of the gas ligands including carbon monoxide. On the other hand, the Met-Hb/Mb are catalyzers of oxidations. Unlike the case of oxygen bound to Hb/Mb, in a carbon monoxide bound form, Hb/Mb are protected from autooxidation. Therefore, to protect meats from autooxidation, carbon monoxide is best applied to fresh meat.

It is thought that the mechanism for carbon monoxide preserving of meat is the much greater affinity of myoglobin for carbon monoxide than for oxygen. Following this mechanism, carbon monoxide out-competes oxygen for binding onto myoglobin molecules within the meat structure. By completely displacing oxygen, the microenvironment of the meat becomes more anaerobic and, thereby, prevents or inhibits the growth of aerobic microorganisms, such as *Escherichia Coli*, which are responsible for spoilage and degradation of fresh meat and illness. Anaerobic bacterial growth, such as Microaerophils, is also inhibited when this method is utilized. This proposed mechanism of carbon monoxide action is merely for illustrative purposes and in no way should be construed as limiting.

The ability to inhibit or prevent the growth of microorganisms allows for the extended storage of meat treated according to the present method. That is, meats treated according to the present invention have a longer storage life and remain both viable and edible in a non-contaminated form for periods longer than those available using current preservation techniques.

In the practice of the present invention, meat samples are placed in an enclosure or container and flushed or exposed to carbon monoxide gas.

The process consists of two stages:

(A) "Meat packing" which refers to introducing the meat into a confined CO atmosphere. "Packed meat" refers to meat which has undergone the meat packing part of the process.

(B) "Meat preservation" which involves maintaining the "packed meat" until it reaches the consumer.

Meat Packing

The container for treatment, storage, and transportation of meat by the method of the present invention can be constructed of various gas-impermeable material such as plastic, metal, and other materials known in the art. The container can be equipped with both gas inlet and outlet channels which can be opened to allow the influx of gas (CO) or closed in order to render the container sealed.

A suitable container would be capable of maintaining a seal to prevent the escape of carbon monoxide gas from the container. For example, the container can be a sealed room in which large amounts of meat may be treated at a given time, the container can also be a smaller sealable container or chamber. Preferably, the container is of larger volume than the volume of meat being treated to allow for a greater volume of carbon monoxide gas to contact the meat sample.

In a preferred embodiment of the invention, meat samples are treated and stored within plastic bags constructed of a material which is safe for the storage of food products such as polyvinylidene chloride. Preferably, the plastic bags will be constructed of a material that is impermeable to the passage of gases therethrough. Thusly, the meat is maintained in the carbon monoxide atmosphere within the bag (container) during storage.

After a piece of meat to be treated according to the method of the present invention is placed in a suitable container, the container is then filled with the CO gas. The addition of the CO gas can be accomplished in any suitable manner; however, the preferred methods include first removing the gas atmosphere present in the container (usually air) by using a vacuum pump, as is well known in the art, to remove any gases present and the container. The container is then filled with CO from a source such as a gas cylinder.

The container is connected to the CO containing cylinder and CO is introduced. Input and output pressures are measured during the filling process. The input pressure is generally maintained within a range of approximately 1.5 to 5.0 atmospheres. The preferred pressure is approximately 2.0 atmospheres. Upon reaching the preferred pressure in the output, the gas flow is stopped and excess gas is allowed to escape until the pressure within the container reaches approximately 1.0 to 1.2 atmospheres. The preferred gas pressure in the container is approximately 1.1 atmospheres.

During the gas filling operation, the ambient temperature of the surrounding can be maintained between −2 to 37° C.

The parameters that govern gas filling or exposure time vary depending on the pressure of the gas input, the dimensions of the inlet and outlet channels, and the dimensions of the container.

For meat packing, exposure of only the surfaces of the meat to carbon monoxide is generally required. However, for the purposes of meat preservation, the gas filling time should be long enough to allow for a sufficient amount of CO gas to be completely absorbed (throughout its thickness) into the meat undergoing treatment. That is, enough CO gas is flushed through the container to allow for the complete penetration and protection of the meat being treated.

The gas filling time generally ranges from approximately one to thirty minutes with the preferred filling time being approximately five minutes. For the purposes of this invention, exposure time is defined as, the gas filling time. Again, it should be noted that the length of exposure of the carbon monoxide to a meat sample will vary depending on the size of the meat sample and the weight of the meat sample being treated. That is, a larger and heavier meat sample will require a longer period of exposure to the carbon monoxide in order to achieve long-term preservation. In other words, a larger meat sample will require a longer exposure to carbon monoxide in order to properly preserve the meat sample without the freezing.

The temperature during the carbon monoxide exposure is preferably between −2 and 37° C. and can vary depending on the temperature selected to in order to carry out the method.

Meat treated as previously described above generally contains from 5 to 100% by weight or volume of CO gas. The preferred volume of CO in the treated meat is approximately 30% of the weight of the meat (e.g. 30 ml for 100 grams of treated meat).

Under the meat preservation method of the present invention, the meat surface is initially contacted with the CO gas. Since the surface of the meat is the most prominent site for the presence of bacteria, the meat treated by the method of the present invention is immediately protected. Further, while sealed in the container, penetration of the CO gas continues until the entire meat mass has been penetrated and, thereby, protected. This total penetration allows for the complete substitution of both hemoglobin and myoglobin by the carboxy forms of these compounds as is shown in the following examples. The total CO treatment of the meat throughout its thickness also enables meat which has been treated according to the present invention to maintain a pleasing color for extended periods of time after the meat has been removed from the packaging or container in which it was treated. That is, as shown in the following examples, meat treated according to the present invention can be transported, unpacked, and then maintained in a fresh form for a further extended period of time without a loss of color or quality.

The above discussion provides a factual basis for the use of the present invention as a method of long-term preservation of meat at different temperatures without freezing. The examples also demonstrate the preservation of the meat after undergoing the treatment of the present invention. The methods used with and the utility of the present invention can be shown by the following examples.

EXAMPLES

Example 1

The Effect of CO Exposure On Time Dependent Changes in Meat Color

Samples of fresh meat (30 grams of beef, veal, or turkey) treated with CO by the method of the present invention were incubated in a suitable container for thirty minutes at a temperature of 15±3° C. Control samples were treated identically to CO-treated meats but were treated with air. The meat samples were removed from the container and were placed on an open benchtop at 15±3° C., or in an air exposed thermostatically controlled environment at 37° C. The color of the air treated meats turned brown gradually (within three hours at 37° C. and twelve hours at 15±3° C.), indicating non-fresh or spoiled meat. In contrast, the CO-treated meat samples maintained a wine-red color for at least 24 hours following exposure.

Example 2

Comparison of CO, Air, $N_2$ and Vacuum Treated Meats

Figure 4:
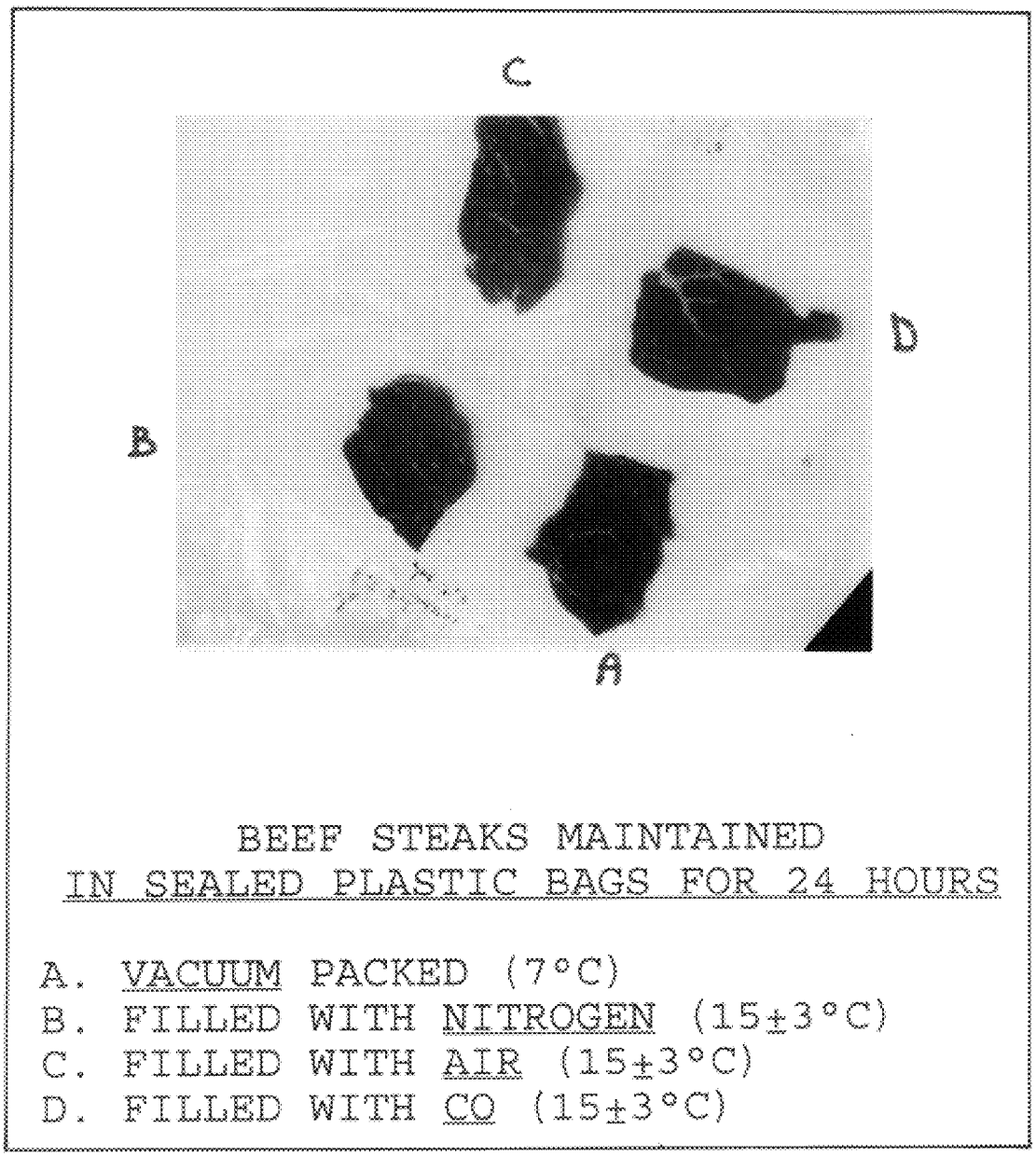
FIG. 4 is a photograph illustrating meats, the colors of meat treated with (A) vacuum only, (B) $N_2$, (C) air, and (D) CO.

Fresh meat quarters (beef) were kept for six days at −2° C. The meat was then cut into 30 gram pieces (4"×2"×0.1") and divided into four groups and treated as follows: (A) vacuumed and (2–4) were introduced into gas tight containers by method previously described above and filled at a pressure of 1.1 atmospheres with gas at a volume which was ten time (10X) the volume of the meat. The gases used were: group D filled with CO, group B filled with $N_2$, and group C filled with air. A portion of the samples was kept at 15±3° C. and the rest at 7° C. After twenty-four hours at 15±3° C. and 48 hours at 7° C. time dependent changes in color were observed. The samples of group A (maintained solely under vacuum) were brownish-purple. The samples of group B ($N_2$ treated samples) were brownish-red. The samples of group C (air treated samples) were brown. However, the color of the samples of Group D (CO treated) were unchanged remaining bright wine-red as shown in FIG. 4.

Example 3

Color Changes in Large Meat Chunks: Time Dependency During Meat Preservation

Beef chunks of 0.5–1.5 Kg were turned into CO-treated meat samples by treating with a 100% meat volume of gas according to the method of the present invention. Control chunks from the same source were treated identically but with air instead of CO. All of the chunks were kept at 4° C. The surface color of the air treated meat became brown after three days. The meat chunks were cut transversely for observation of color changes. Color change propagated with time in all meats from the surface towards the center of the chunk and were brown in air treated samples and wine-red in CO-treated samples. Following eighteen days of incubation, the air treated chunks were completely dark brown. In the CO-treated meat, the color change was 3–5mm from the surface after one and a half hours. Twelve hours post treatment a two cm ring of color change was observed. Three days post treatment, only five percent of the area of the transverse section remained unchanged. After seven days post treatment the color change was complete.

Propagation of the color from the surface into the interior of the chunks for chunks kept under 5% meat volume of gas was somewhat slower as compared to those chunks maintained kept under 100% meat volume gas. It is important to note that care should be taken to prevent adherence of any of the meat surface to the container.

Example 4

Figure 5:
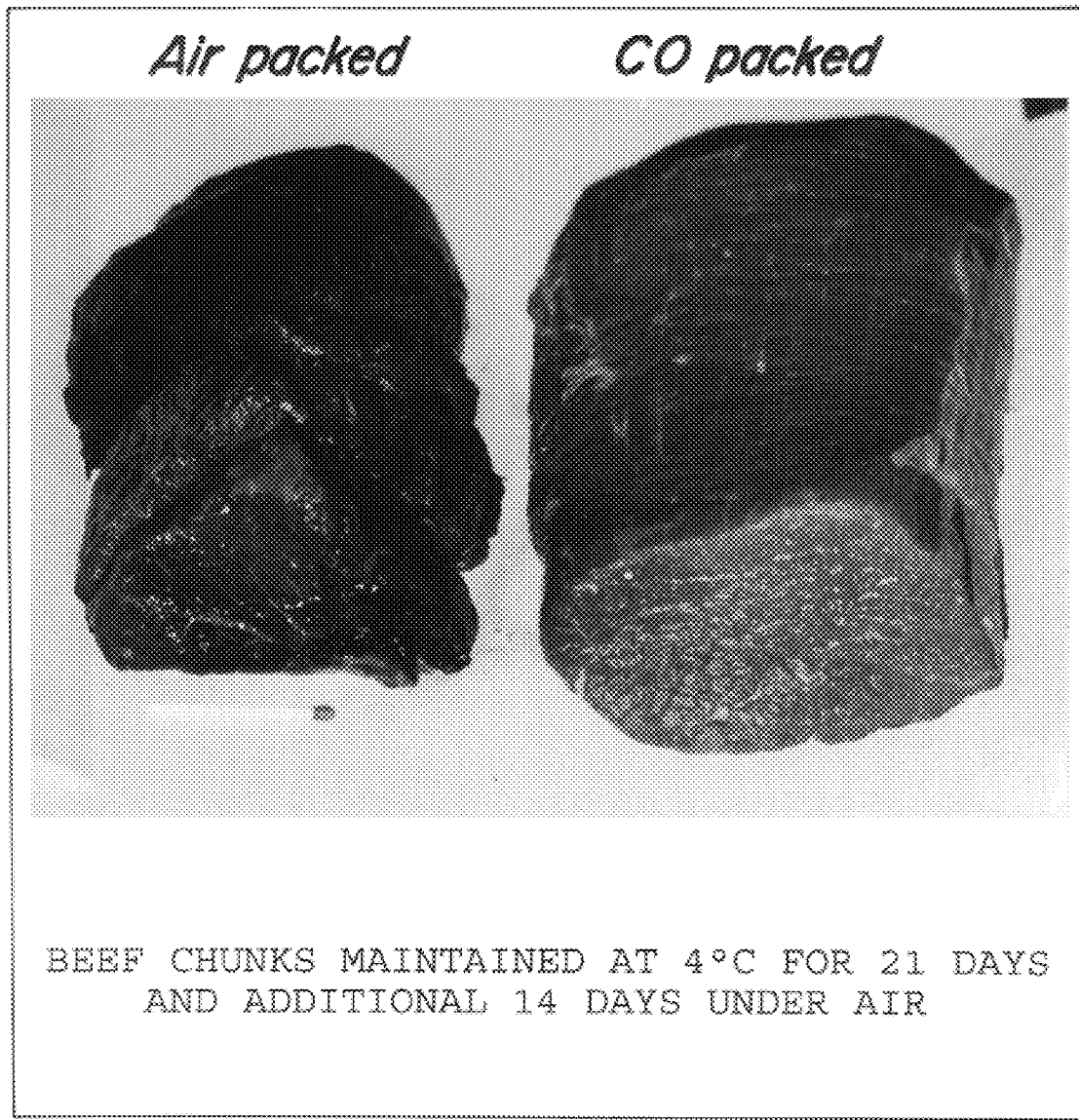
FIG. 5 is a photograph illustrating the color change in meat treated without CO (left) and meat treated with CO (right)
Figure 6:
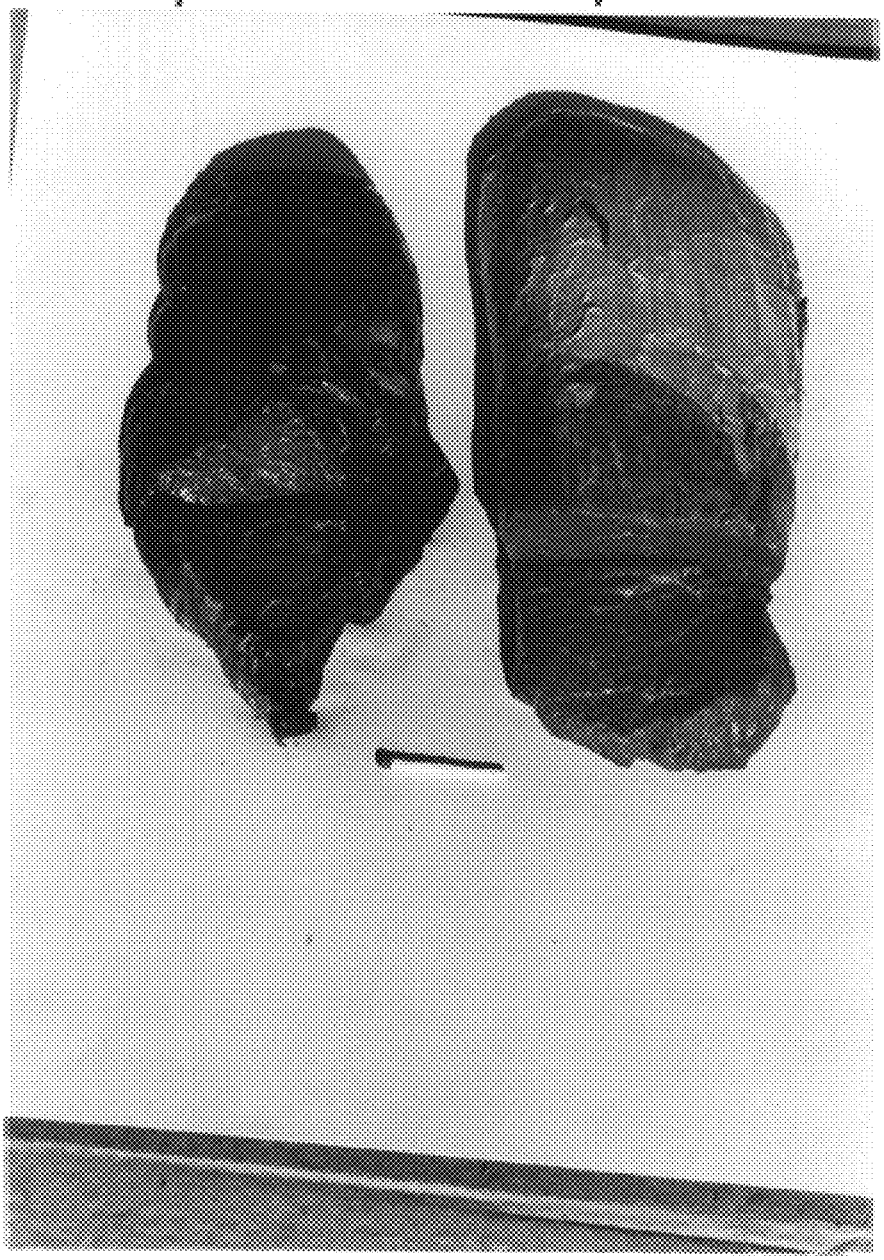
FIG. 6 is a photograph illustrating the internal color change of meat treated without CO (left) and meat treated with CO (right)

Color Changes in Large Meat Chunks: Time Dependency After Removal From Container An experiment similar to the previous example was performed except that the CO-treated meat chunks and the air treated meat chunks were removed from their containers after 21 days. The colors observed were the same as in the previous example. The chunks were left open to the atmosphere at 4° C. The color of the CO-treated was maintained for fourteen days. At day 14, only the surface (<1 mm deep) of the CO-treated meat was brown. The color of the air treated meat remained dark brown throughout as shown in FIGS. 5 and 6.

Example 5

Comparison of Bacterial Growth Under Air, CO and $N_2$ Atmospheres

Meat samples weighing 4.00±0.18 grams, were treated by flushing with either air, CO, or $N_2$. After twenty-four hours of storage at room temperature (15±3° C.) each of the treated meat samples was soaked in sterile 0.15M sodium chloride (1 ml per 2 grams of treated meat) for ninety minutes to extract any bacteria present on the surface of individual samples. Aliquots of serial dilutions of the extracts were plated onto non-selective agar plates (Bactoagar, Difco) and on Gram negative selective plates (MacConkey, Difco). All the plates were incubated over night at 37° C. to allow bacterial growth. Bacterial colony counts per gram of meat (mean±SD) are summarized in Table 1.

TABLE 1

| Gas in | No. of colonies | |
|---|---|---|
| Atmosphere | grown on bactoagar | gram negative |
| Air | (1.42 ± 0.3) × $10^6$ | (2.74 ± 1.12) × $10^6$ |
| $N_2$ | (1.63 ± 0.3) × $10^6$ | (0.46 ± 0.25) × $10^6$ |
| CO | (0.29 ± 0.01) × $10^6$ | (0.02 ± 0.01) × $10^6$ |

Example 6

Toxicity and Edibility of CO-Treated Meat

Samples of CO treated meat of approximately 30 grams in weight or ground meat samples were stored for up to seven days at a temperature between 4 to 10° C. Samples of the CO treated meat were given to twelve starved cats (4 kg per cat). Under these conditions, the meat samples were immediately consumed. No mal-effects were observed in any of the animals within 48 hours post consumption.

Additionally, four dogs each of which weighing approximately fifteen kilograms was offered 100 to 150 gram sample of CO preserved meat. The samples were consumed by the dogs and no mal-effects were observed in any dog within 48 hours after consumption.

Figure 3:
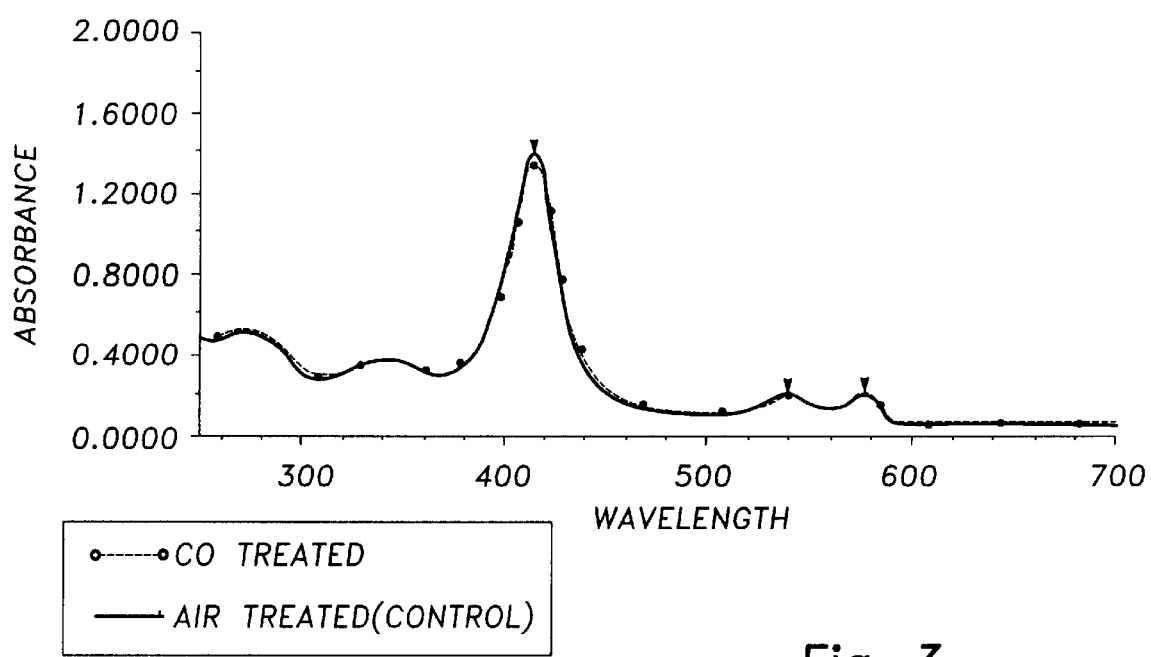
FIG. 3 is a graph illustrating spectral analysis of the amounts of hemoglobin in the blood of cats that consumed either CO treated meat or air treated meat.

Cats were fed fresh CO treated meat (250 grams per day per cat for one week). A control group was fed meat from the same source which was treated identically but with air instead of CO. The animals were continuously monitored by animal-tenders and showed regular behavior. The animals were found healthy by a house veterinarian. At the end of the experiment, a blood sample was drawn from all the animals and the red blood cells were separated. The state of hemoglobin in these cells was analyzed spectrophotometrically as shown in FIG. 3. From the spectra, it was found that the hemoglobin of both groups was completely in the oxy-hemoglobin form indicating no CO in the blood of the animals fed CO-treated meat.

Example 7

Determination of Shelf-Life Extension by Bacterial Count as Limited by International Control Standards: Preservation at Room Temperatures General Methods:

Meat packing: Freshly slaughtered meat (beef) chunks of 0.5–1.5 Kg were cut into 25 $cm^2$ pieces, 0.5–1.0 cm width (12–20 grams). Four samples were immediately submitted to bacterial count (as described below). The rest of the samples were treated with CO according to the method of the present invention. The gas pressure was 1.1 atmospheres and the volume of gas was equal to (100%) of the meat weight. The gas content was either air or 100% CO. The samples were preserved within a predetermined temperature range. Bacterial growth was measured at time intervals determined according to the temperature of preservation.

Evaluation Of Hemoglobin And Myoglobin Oxidation State In CO Treated Meats:

The quality of the CO-treated meats depends on the amount of globin fractions converted to CO bound forms and their location. The location is important since bacterial growth starts on the surface of the CO-treated meats as does CO penetration. Assessment of the CO bound myoglobin and hemoglobin in the CO-treated meats was carried out using two parameters: (a) measurements of the circumference width of zones which underwent visible color change due to CO binding (CO-treated meats were successively cut transversely and the depth of the color-changed zone was measured with a ruler) and (b) assessment of the CO bound fraction of hemoglobin and myoglobin in CO-treated samples.

Procedure: Samples of the CO-treated meats (1 to 5 grams) were homogenized in an equal volume of phosphate buffer (0.1M, pH 7.4) to extract both hemoglobin and myoglobin. The extract was centrifuged at 40,000 g for ten minutes. The supernatant was isolated and its absorption spectrum was measured in the 400 to 700 nm range. From the position of the absorption peaks and their relative heights the fraction of CO bound globins was calculated.

Bacterial growth measurement was made according to international standards and carried out by a ISO 9000/IEC Guide 25 licensed bacteriological laboratory. As bacterial growth is mostly on the meat surface, the routine contamination tests at governmental laboratories relate to bacterial growth on a standard minimal area of 25 cm². The bacterial growth is then expressed as the number of bacteria per cm². The most stringent standards allow a growth of up to $5 \times 10^6$ (6.7 in log scale) bacteria per cm² while the least strict ones consider a growth of up to $1 \times 10^7$ (7.0 in log scale) non-contaminated.

The procedure entails treating a 25 cm² surface area sample of the meat with 25 ml of aqueous solution. The bacterial content is introduced into the solution using a stomacher apparatus (Seward Lab U.K.). This suspension is then diluted in a ten fold series up to $10^{-9}$ in 0.1 M phosphate buffer, pH 7.0. One ml of each dilution is applied to each of three types of 60mm growing plates: (a) containing plate count agar (PCA, Difco) incubated at 33° C.±0.2 for 48 hours to enable total viable aerobic count, (b) containing SPS agar (Difco) allowing clostridium growth, and (c) containing the same medium as a (a) allowing microaerophile growth. Type (b) and (c) plates were confined within sealed anaerobic jars supplied with gas generating kits (Oxoid, U.K.) and incubated for twenty four hours at 35° C. Bacterial colonies (up to 200 per plate) were counted using a colony counter.

According to international health standards, the maximal bacterial growth allowed for non-contaminated meat is $1 \times 10^7$/cm² total viable aerobic bacteria and $1 \times 10^4$/cm² of microaerophils. The shelf life of a meat in a non-contaminated form was determined by the duration until the above defined bacteria levels were reached ("preservation duration").

Figure 2A:
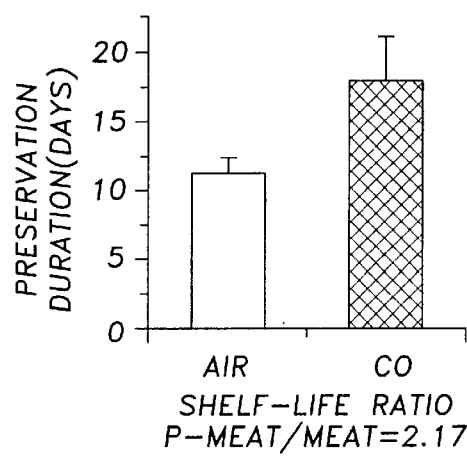
FIG. 2*a* is a histogram illustrating preservation duration of CO preserved meats and air treated meat preserved at 5±3° C. as determined by Microaerophil growth.
Figure 2B:
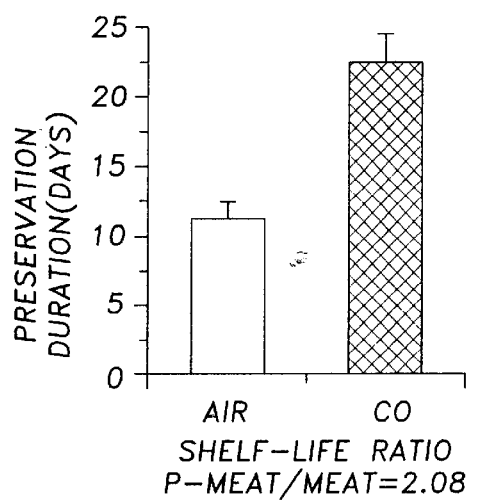
FIG. 2*b* is a histogram illustrating preservation duration of CO preserved meats and air treated meat preserved at 5±3° C. as determined by total viable aerobic bacterial growth.

Twenty experiments were carried out as follows: meats samples were preserved at 5±3.5° C. and bacterial counts were carried out at intervals of four days. The length of "preservation duration" in these experiments (expressed as mean ±SE) were for microaerophils: 8.72±2.1 days for air treated samples and 18.9±3.27 for CO-treated samples (see FIG. 2a); by the criteria of total viable aerobic bacteria 11.13±1.11 days for air treated meat samples and 23.12±2.79 for CO-treated meat samples (see FIG. 2b).

This data shows that the meat preservation method of the present invention succeeded in extending the shelf life more than two fold.

Example 8

Determination of Meat Shelf-life Extension by Bacterial Count as Limited by International Control Standards: Preservation at High Room Temperature As in the previous example, meat samples were preserved at 26±4° C. Due to the high temperature which accelerates bacterial growth, bacterial count was determined at five hour intervals. Four experiments were carried out and the length of "preservation duration" in these experiments (expressed as mean±SE) were: by the criteria of total viable aerobic bacteria 13±1 hours for air treated samples and 30±1 hours for CO-treated samples (see FIG. 1). By the microaerophils count criteria: 9.5±0.9 hours for air treated samples and 9.5±0.8 hours for CO-treated samples.

Example 9

Inhibition Of Bad Odor Development In CO Treated Meats

In all meats preserved as in examples 1 through 8, it was found that by the time of detection of bad odors in air preserved meats, no similar odor was detected in the CO-treated meats. This finding indicates that the arrest of meat-spoilage was achieved by the meat preservation method of the present invention. Consistently, in all preserved meat samples bad odor was detectable in samples which showed high count of bacteria. Additionally, by the time bad odor was detectable by the average human nose, the total viable aerobic count exceeded $10^8$ colonies/cm², a value which exceeds that allowed for non-contaminated meats ($10^7$ colonies/cm²). Thus, odor is a less sensitive indicator of meat spoilage than bacterial count. However, odor is valuable because it can be used by most people including the meat consumers.

Table 2 represents the "preservation duration" under various conditions at which CO-treated meat retained pleasing odors while air preserved meat smelled badly.

TABLE 2

| Type of meat | Size | Temperature range of preservation, ° C. | "Preservation duration in days |
|---|---|---|---|
| Beef | Slices | 2–9 | 18 |
|  |  | 22–30 | 3 |
| Beef | Chunks | 2–9 | 18 |
|  | Chunks | 14–17 | 7 |
| Veal | Slices | 22–30 | 3 |
| Turkey | Slices | 22–30 | 3 |

Example 10

CO Diffusion From Meat Surface into the Core During the Preservation

Figure 7:
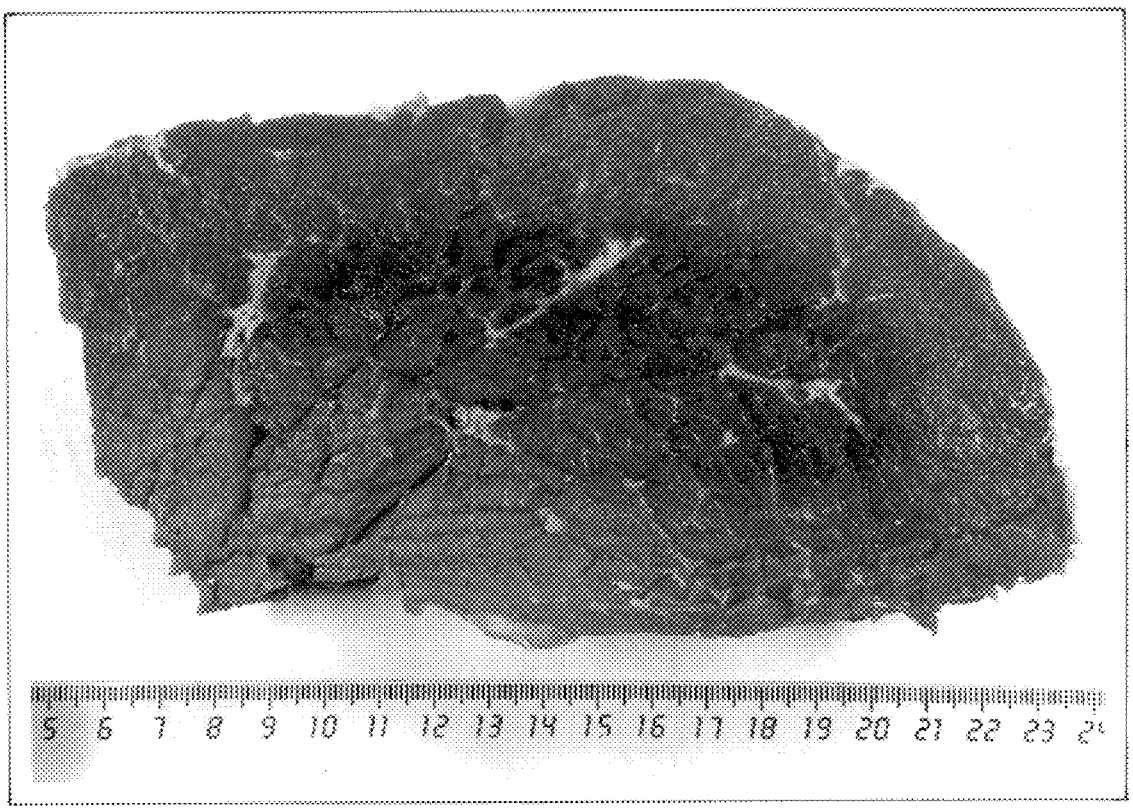
FIG. 7 is a photograph illustrating the color change of a piece of fresh CO treated meat stored at 5° C. for three days.
Figure 8:
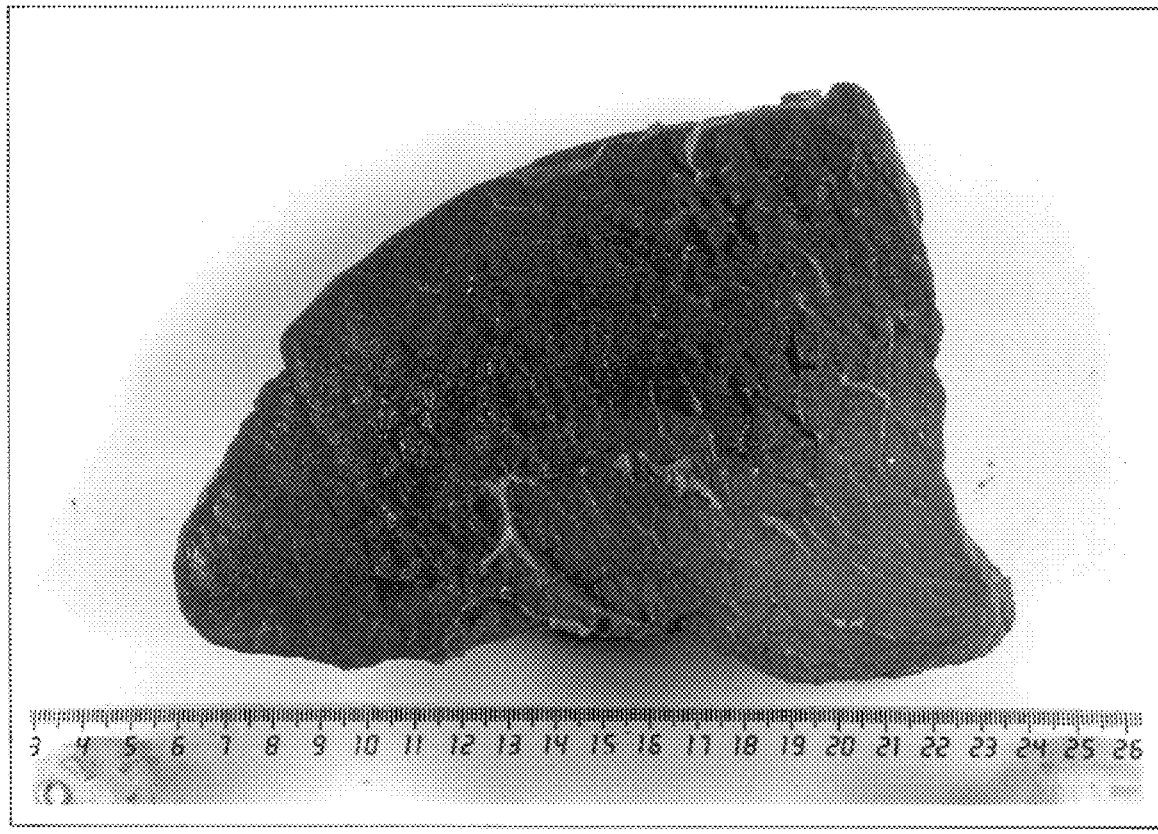
FIG. 8 is a photograph illustrating the, same meat sample shown in FIG. 7 stored with CO at 5° C. for ten days.
Figure 9:
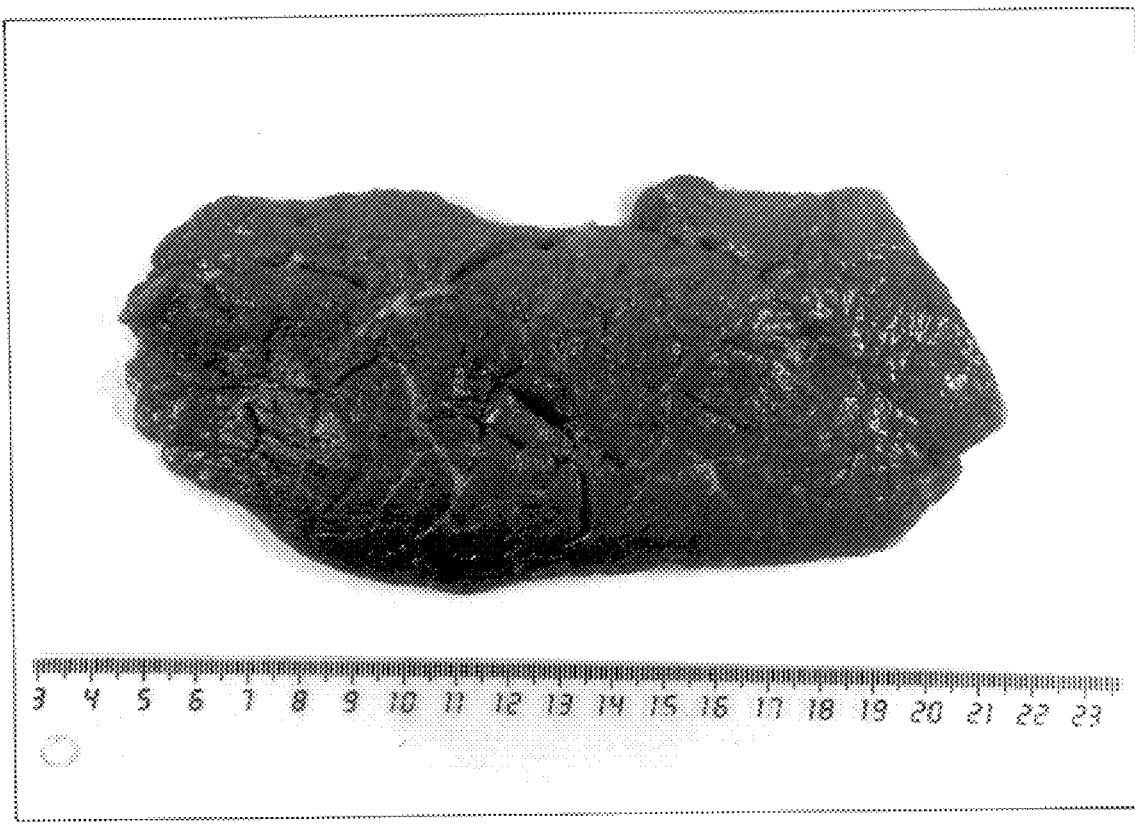
FIG. 9 is a photograph illustrating a transverse cut of the meat sample shown in FIG. 8 made at 7 cm from the edge showing homogenous bright red color.

Meat samples were sealed in plastic bags under 100% CO at a pressure of about 1.1 atmosphere. CO volume was 30±20% of the meat volume. The bags were kept at 5° C. FIGS. 7–9 demonstrate a typical experiment in which meat was treated 24 hours after slaughter. A sample of calf meat weighing 18 pounds (about 8 Kg) was cut into two nine pound pieces having maximum length of 30 cm and maximum width of 20 cm. One of these samples was kept frozen at −18° C. while the other was preserved in CO at 5° C. After three days, the bag was opened to release the unbound CO and the meat was left in the open air for half an hour. The meat sample was cut transversally at about one third of its length (7 cm from one edge). About 30% of the meat radius (from surface to core) changed in color from dark to bright red (see FIG. 7). Because any CO which reaches Hb/Mb bind quickly, the change in meat color serves as a measure of the CO diffusion rate.

Figure 10:
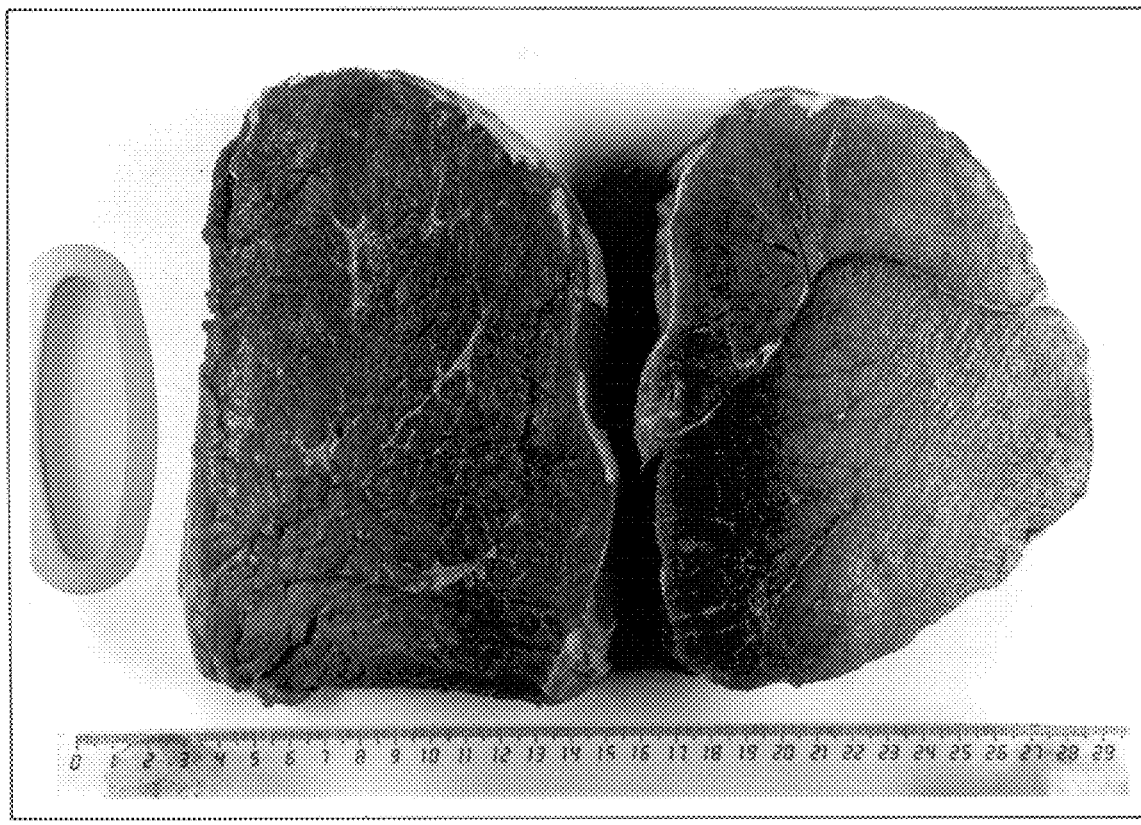
FIG. 10 is a photograph illustrating transverse cuts of CO treated (left) and frozen (right) meat samples after twelve days of storage.

The meat samples were reassembled and repacked with CO. Following seven additional days at 5° C., the meat samples was again unpacked and cut transversally once in the middle of the sample, about 15cm from the edge (shown in FIG. 8), and once closer to the end of the sample, at about one third of the sample's length (shown in FIG. 9). As shown in the transverse cut in FIG. 8, the meat was almost completely bright red except for a small dark red area shown by an arrow. This indicates a, nearly complete diffusion or saturation of the CO from the surface to the core of the meat sample. The cut at one third of the sample's length shows that in this zone, oxy-Hb/Mb were completely converted to their carbomonoxy forms as shown in FIG. 9. The meat samples were reassembled and kept at 5° C. under CO for an additional two days to ensure complete conversion of Hb/Mb to the carbomonoxy forms. After 12 days under CO at 5° C., the color of a middle sample (transverse cut) differed dramatically from that of the frozen sample (see FIG. 10), indicating that oxy-forms of Hb/Mb were preserved in the frozen meat sample (FIG. 9, right) while carbomonoxy forms prevailed in the CO treated meat (FIG. 10, left).

Example 11

Appearance of the Cooked Meats

Figure 11:
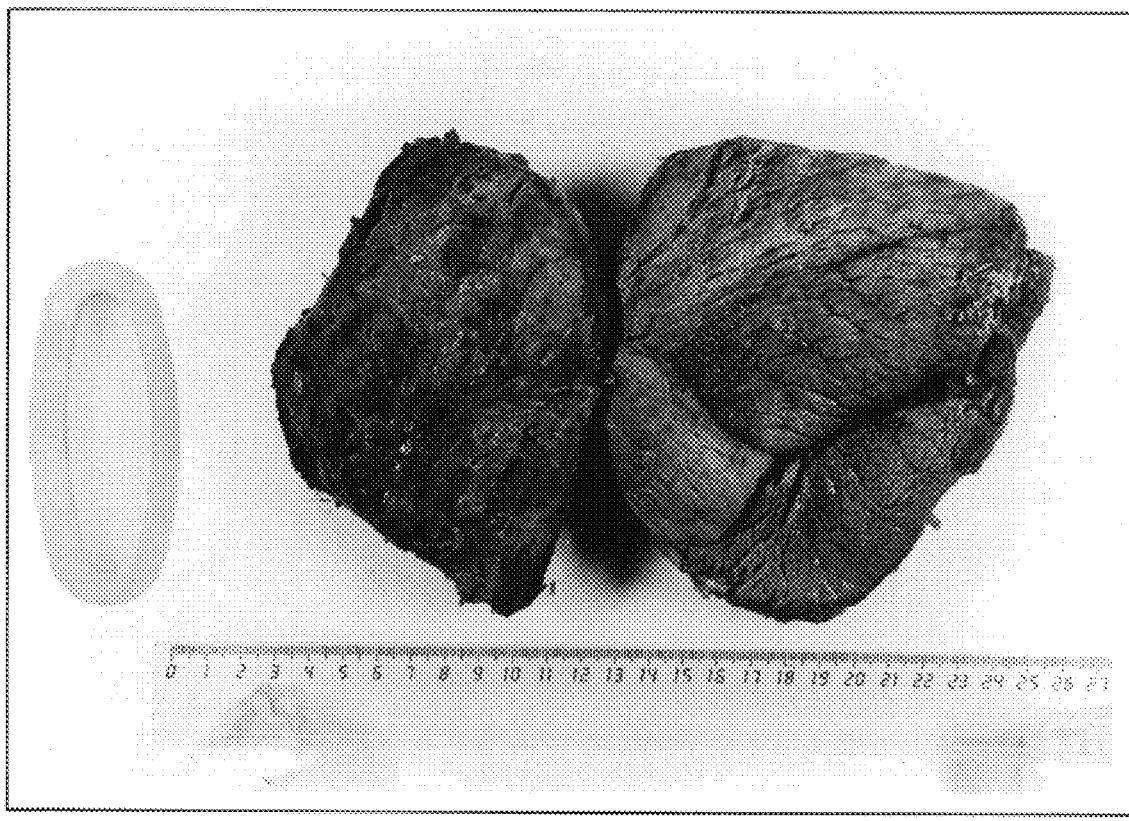
FIG. 11 is a photograph of the transverse cuts of meat shown in FIG. 10 after cooking.

From the 12 day-old, frozen and CO treated meats (shown in FIG. 10), 5 cm in width pieces were cut transversally. Each piece was cooked in 100 ml distilled water in a covered pot on a low flame for 120 minutes. At the end of the cooking period, all of the water had evaporated. The appearance of the cooked meat pieces is shown in FIG. 11. They were similar except for some browning of the surface of the CO treated meat due to complete water loss in the meat.

Figure 12:
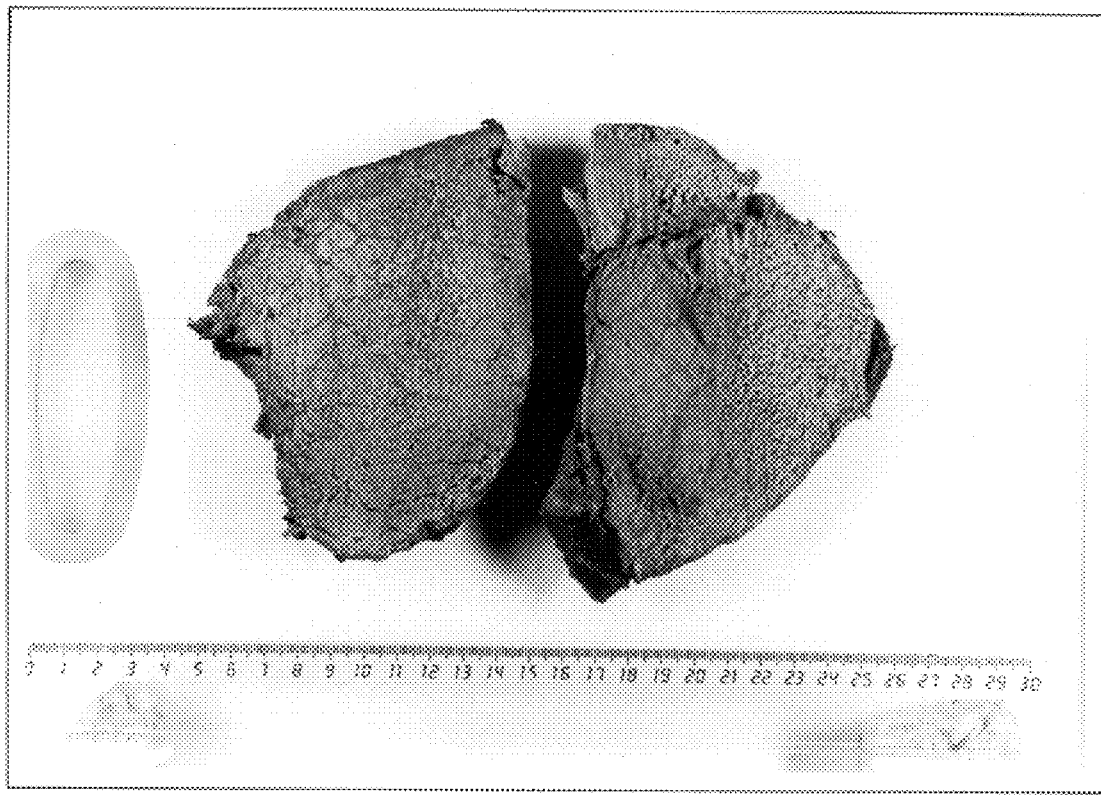
FIG. 12 is a photograph illustrating transverse cuts of the cooked meat samples shown in FIG. 11.
Figure 13:
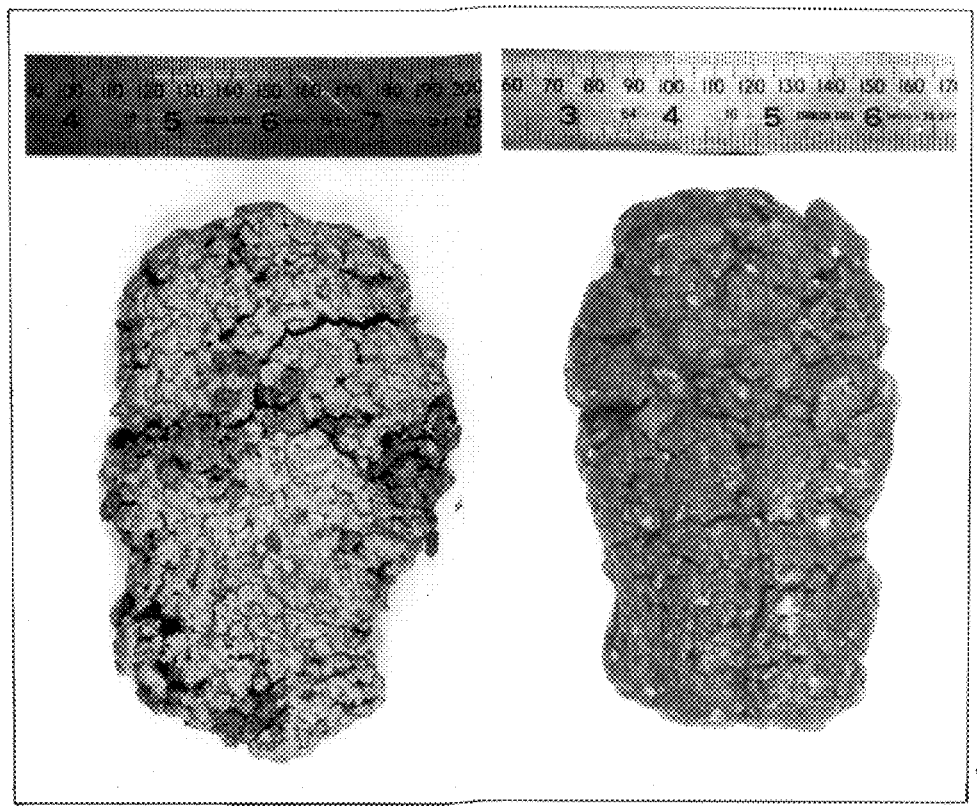
FIG. 13 is a photograph illustrating a section of CO treated meat as shown in FIG. 10, following exposure to open air at 5° C. for two weeks, at the end of this two week period, the meat sample was ground, a 200 gram "hamburger-like" sample was cooked and released CO was measured, (top) prior to cooking, (bottom) following cooking.

To reveal the meat interior, the two pieces were cut transversally. A small test by ten different people assured that pieces smelled alike having a typical cooked meat smell. The transverse sections are seen in FIG. 12 and were very similar in appearance. This experiment demonstrates the loss of the bound CO during the cooking process (heating) which leads to protein denaturation and heme degradation.

Example 12

Measurements of CO Release in the Process of Cooking

A. Experimental Procedure:

All measurements of CO release in the process of cooking were carried out in a 7.5 liter sealed regular pressure pot ("pressure cooker") to which manometer/thermometer was inserted to measure the temperature and pressure during cooking. The pot was also equipped with a controlled outlet (valve). To ensure complete sealing the pot lid was also smeared with a layer of high vacuum grease prior to locking the pot. The pot was then heated by cooking gas for a few minutes until reaching a pressure of 1.5 atmospheres and a temperature of 235° F. (113° C.). At this stage the pot was transferred to an electric heater for further cooking keeping the pressure within the pot at 1.7±0.7 atmospheres and the temperature at 114±12° C. Cooking time varied among experiments within the time range of regular domestic cooking, namely 60–140 minutes. The pot was allowed to cool until reaching room temperature and then was connected via the valve to a CO monitor. The CO level in the pot atmosphere was expressed in PPM.

The measure CO level in PPB(m) was translated and expressed as CO PPM(c) released from 2 Kg of cooked meat (a family meal size) into a sealed room of 3.0 square meters (kitchen size dimensions). Considering the volume of one mole of gas at room temperature as 22.4 liters, the expected CO level was calculated as:

$$PPM(c)=0.074 \cdot PPM(m)/X$$

Where: PPM(c)=calculated PPM;
PPM(m)=measured PPM;
X=meat weight in grams.

B. Safety in Cooking the CO Treated Meat:

200–650 gram meat samples (either in one piece or ground) were treated with CO and stored within a confined CO atmosphere for 14 days at 5° C. The meats were cooked within 30 minutes of removal from the CO packaging bags. The results (expressed as explained above) are summarized in Table 3. As can be seen, the average PPM(c) level given as Mean ±S.D. (N) was 0.056±0.026 (10). In all experiments, less than 0.1 PPM of CO was released from 2 Kg cooked meat into the hermetically closed room. Since the TLV for CO is 25 PPM, it can be seen that the released CO level from the cooked meat (2 Kg) in our experiments, was far below that safety limit. In fact it is low enough not to alarm a domestic CO detector (100 PPM for 90 minutes in a regular room size). Thus, under our experimental conditions, the consumer is not exposed to danger. Moreover, treated meats could be removed from their CO packing bags and maintained for at least 14 days in the open air at 5° C. without any risk of CO release prior to cooking.

No statistically significant test analysis could be made because the experimental conditions were incomparable (chosen to cover various cooking conditions). However, there is a trend showing that the level of released CO is inversely correlated with the post-slaughter period until CO treatment began. Thus, the sooner (closer to slaughtering) the meat was treated, the higher the CO level (see the declining order in items 1–4 in ground meat in Table 3). Note that CO release level reflects the CO bound level in the meat. These findings agree with a slow autooxidation of Hb/Mb in meats exposed to air prior to CO packing, resulting in formation of met-Hb/Mb which can no longer bind CO. Therefore, upon packing, less CO will be bound and consequently less CO will be released later upon cooking. The data from the experiments (items 6–8a in Table 3) suggest that up to a period of two days post-slaughter, CO release level was similar.

From items 8a–8c (Table 1), wherein the portions of the same CO treated sample were removed from the CO packing bag and exposed to open air for various periods, it appears that the CO was maintained within the samples for at least three days.

Example 13

Release of CO by Cooking

Freshly drawn human blood was used. The red cells were washed and lysed in a hypotonic buffer. The mixture was centrifuged to separate cytosol from membranes. The concentration of hemoglobin in the solution was measured spectrophotometrically and was found to be 16.2 mM. The solution was sealed in a beaker and CO was gently flushed above the solution surface while stirring for 30 minutes. A few grains of dithionite was added to consume any residual oxygen. The color of the solution turned bright. red typical of carbomonoxy Hb. The solution was then left while stirring (for 15 minutes) to the open air to released dissolved CO. The Hb was identified spectrophotometrically as carbomonoxy Hb. The hemoglobin solution was cooked exactly as the meat and the amount of CO in the pot atmosphere was measured. From the concentration of hemoglobin (each heme molecule binds one CO molecule) the amount of CO molecules was calculated in the solution. From this amount and the pot volume, the expected PPM level of totally dissociated CO was calculated. As in the procedure of cooked meats the gas level in the pot was measured by the CO monitor. The ratio of measured to calculated CO level turned out to be 1.06 indicating that, within experimental error, all CO was indeed released from the Hb by cooking.

TABLE 3

CO RELEASE FROM COOKED MEATS

| Item No | Meat form | Post Slaughter period to treatment (days | PPM(c) of CO |
|---|---|---|---|
| 1) | Ground | 6 | 0.052 |
| 2) | Ground | 8 | 0.039 |
| 3) | Ground | 8 | 0.039 |
| 4) | Ground | 10 | 0.013 |
| 5) | Ground | 1(14)* | 0.033 |
| 6) | Chunk | 0 | 0.093 |
| 7) | Chunk | 0 | 0.053 |
| 8a) | Chunk | 2 | 0.071 |
| 8b) | Chunk | 2(1)* | 0.076 |
| 8c) | Chunk | 2(2)* | 0.088 |

All meats (200–650 gr) were treated with CO and were stored in CO atmosphere for 14 days at 5° C. The meats were cooked within 30 minutes after exposure to air. (*) refers to exposure period at 5° C. (in days) in the open air following removal from CO packaging bags. Items 8a–c are sub-chunks which were left in the open air for different time periods.
Average PPM(c) = 0.056 ± 0.026

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. Preserved raw meat completely saturated with carbon monoxide through its entire thickness and exhibiting complete conversion of its myoglobin and hemoglobin to carboxy forms produced by the method consisting of the steps of:

completely saturating raw meat to the core in carbon monoxide by exposing said meat to an atmosphere consisting essentially of carbon monoxide;

maintaining the carbon monoxide saturated meat in a sealed container at at least one atmosphere of pressure for a time period sufficient to completely convert the myoglobin and hemoglobin in the meat to carboxy forms prior to autooxidation of the myoglobin and hemoglobin to maintain color and freshness while retarding bacterial growth.

* * * * *